Feb. 6, 1962 H. G. TERNOW 3,019,841
CASING COLLAR LOCATOR
Filed Aug. 15, 1957 2 Sheets-Sheet 1
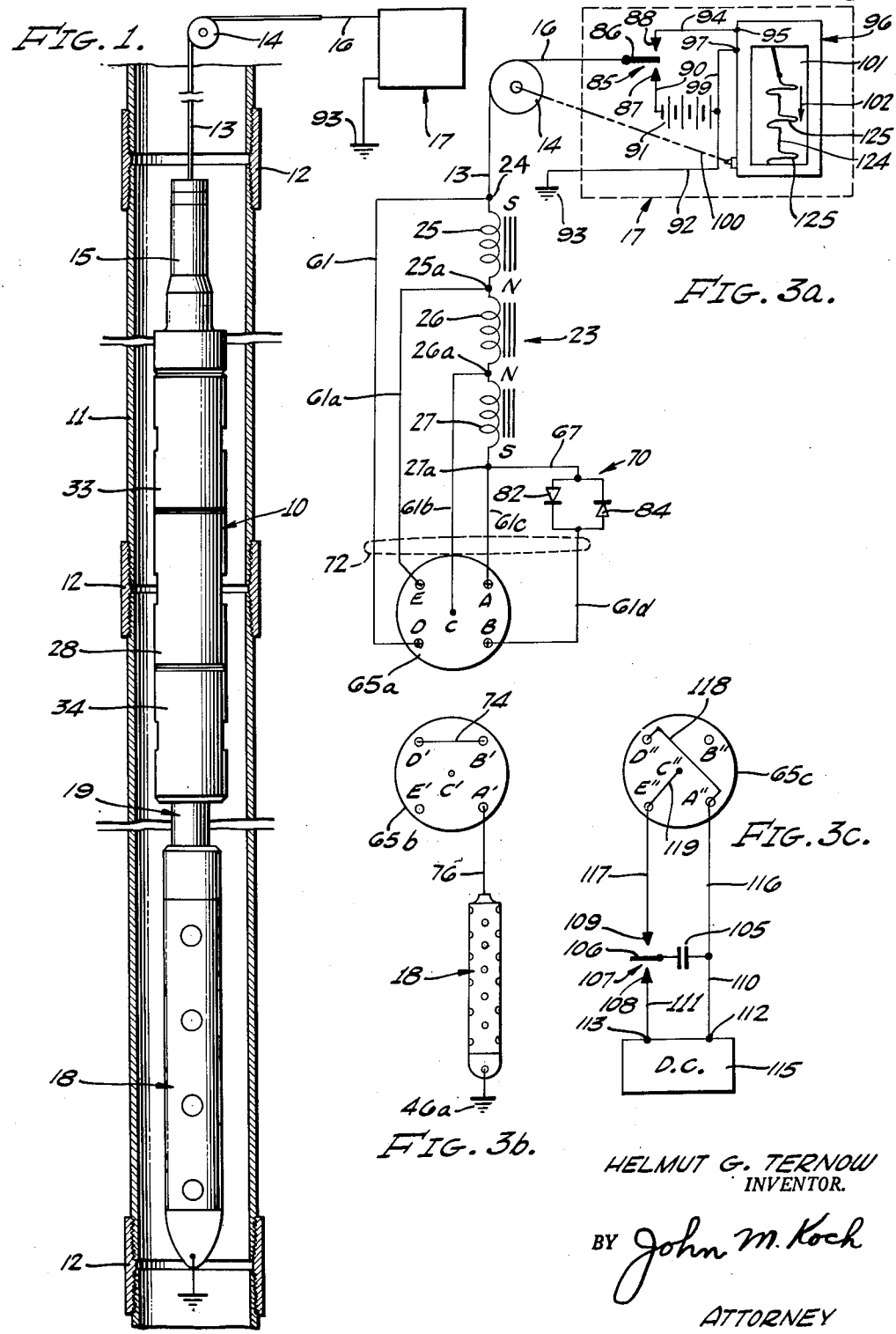
HELMUT G. TERNOW
INVENTOR.
BY John M. Koch
ATTORNEY

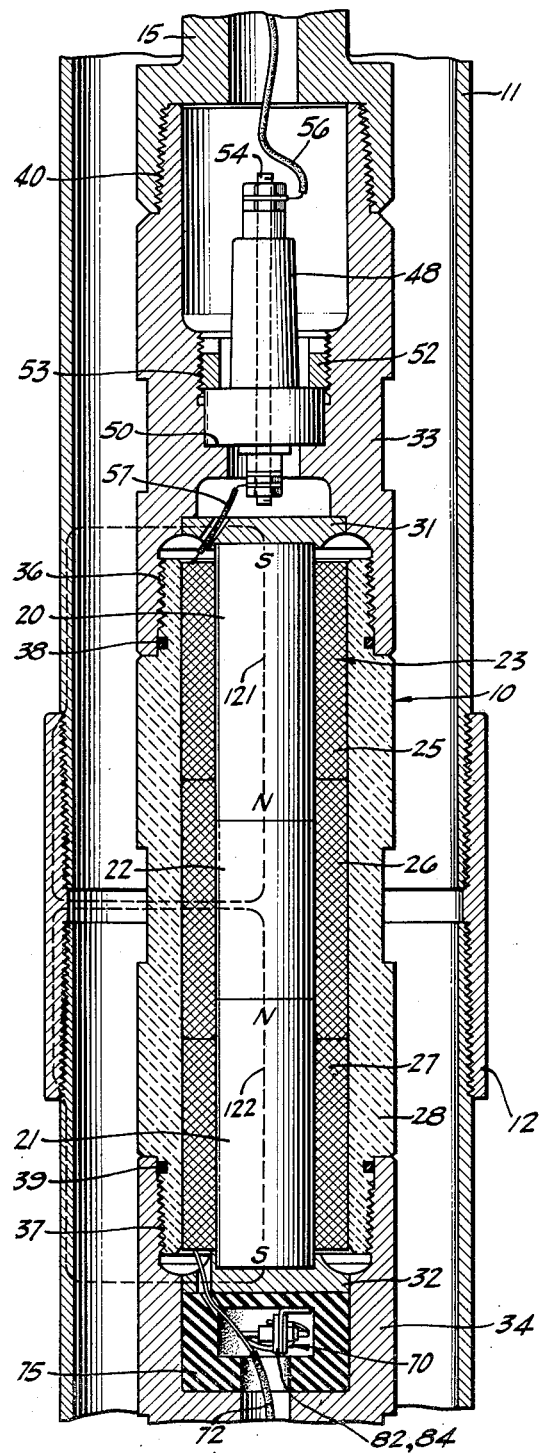

3,019,841
CASING COLLAR LOCATOR
Helmut G. Ternow, Sierra Vista, Ariz., assignor, by mesne assignments, to Dresser Industries, Inc., Dallas, Tex., a corporation of Delaware
Filed Aug. 15, 1957, Ser. No. 678,380
8 Claims. (Cl. 166—55.1)

This invention relates to magnetic apparatus for locating discontinuities such as joints between interconnected sections of tubing, casing, pipe and the like metallic tubular goods, and more particularly to an improved construction of such apparatus adapted to be lowered into an earth borehole on a conductor cable for logging casing string joints in such borehole correlated with depth.

Magnetic casing joint locator apparatus of this type, which is dependent upon movement of the apparatus through the casing joints for generating an electric signal whenever it passes a magnetic discontinuity or variation in reluctance associated with such casing joints, has heretofore been in successful use, but such apparatus has been found to be in need of improvement for the production of stronger and clearer signals, with less interfering extraneous effects and so-called noise.

In prior magnetic casing joint locator apparatus, a multiplicity of relatively narrow magnetic pole pieces have usually been employed which, together with a surrounding casing into which it is lowered, forms in effect a so-called magnetic bridge circuit arrangement. Such magnetic bridge circuit arrangement results, in general, in a sensitive detector of reluctance changes such as result from movement of the device through a casing joint. However, where the pole pieces are relatively narrow with respect to the longitudinal axis of the device and where more than two concentrated laterally extending pole pieces are used, a corresponding number of concentrated magnetic fields are produced which extend outwardly to the surrounding casing. This condition appears to result in a reduction of the desirable sensitivity of the device for locating the casing joints while increasing the undesirable sensitivity thereof to disturbing influences within the casing which produce the so-called noise signals. The use of a plurality of narrow magnetic pole pieces also results in a multiplicity of concentrated field flux paths which appear to result in the production of several minor signals having a tendency to distort and confuse the desired major joint detection signal.

Furthermore, the use in prior art apparatus of relatively few coil turns in close association with the magnets results in the production of a comparatively low induced voltage in the coil for a given change in magnetic flux. Taken together, these deficiencies of prior art apparatus result in the production of a group of signals of varying strength and clarity, rather than in a single strong clear signal that can be relied upon with safety as denoting the exact location of a casing wall deviation, such as a joint or casing collar. Instead of precisely locating the wall irregularity by the use of such apparatus, it is found within a range of spaced or overlapping signals corresponding to a significant length of casing wall. This inherently results in an appreciable location error because of the necessity of making an interpolation.

Locator apparatus of this type often is used in conjunction with certain other apparatus or tools to be operated within the borehole such as, for example, a casing wall perforating gun. In such an arrangement the locator and perforating gun are usually coupled together end to end with the perforator apparatus positioned just ahead of the locator apparatus as the assembly thus formed is lowered into the well casing to be perforated. The desired position for discharging the gun is determined by locating a reference casing joint or collar by means of signals received from the locator apparatus, and the gun is then fired by passing an initiating electric current through the locator apparatus to the gun perforator apparatus. In prior art apparatus, the initiating current for igniting the perforator gun charge usually is passed directly through the series connected coil of the locator apparatus. Even though this coil is wrapped largely around a high permeability magnetic material positioned intermediate two permanent magnets, and not directly over or around the magnets, the initiating current tends to demagnetize one or the other of the magnets, thus rendering the locator apparatus less sensitive and making it necessary frequently to remagnetize the magnets. Also, since in the prior art apparatus the detecting coil is not positioned around the field magnets, such magnets cannot be remagnetized in position in the apparatus and heavy spare apparatus for this purpose must be taken along during operational trips to the field.

Accordingly, it is an object of this invention to provide locator apparatus of the type described above which will produce stronger, clearer and sharper casing joint location signals relatively free of extraneous signals and so-called noise so that casing wall joints can be located more positively and accurately.

Another object is to provide such an apparatus which will permit repeated passage of perforator gun firing electric current through the apparatus without an appreciable tendency to demagnetize the magnets.

A further object is to provide an apparatus of this type wherein the magnets may be magnetized in position in the fully-assembled apparatus, and also may be demagnetized in the apparatus to facilitate disassembly thereof.

Additional objects, advantages and features of novelty will become apparent from the following description of the invention.

Briefly stated in general terms, the objects of this invention are attained by the provision of a locator adapted to be lowered on a suitable conductor cable into a fluid-containing well pipe or casing and comprising two magnets positioned adjacent each other in an end-to-end, coaxial alignment, with their polarities opposed, thereby forming, in effect, two oppositely-poled, coaxial, magnetic circuits having virtually only a single common pole of relatively wide longitudinal extent located intermediate the adjacent ends, and having poles of like polarity at opposite outer ends of said magnets. An inductor coil is wound around the major portion of the length of the two coaxial magnets and positioned symmetrically longitudinally with respect thereto, whereby relatively high voltages will be induced in such coil by external influences which cause relatively small unbalanced changes in the magnetic flux in the two magnetic circuits, whereas relatively low voltages will be induced in such coil by other external influences which cause substantially equal changes in the flux in the two magnetic circuits. Thus the apparatus is relatively insensitive to and relatively free from the production of so-called noise or extraneous signals resulting from lateral movement and variations in centering of the apparatus within a well pipe or casing, whereas it is more sensitive to longitudinal movement relative to unsymmetrical discontinuities in the surrounding well pipe or casing such as are inherent in the couplings and joints thereof.

The objects of the invention also are attained by providing in conjunction with the apparatus a novel electrical circuit and electronic means for electrically by-passing or shunting the inductor coil of the casing joint locator apparatus when it is desired to pass an electric current, of a relatively large value as compared to the current induced in the inductor coil in the joint locating operation, through a single conductor cable to which the locator apparatus is connected, to other apparatus suspended below the locator apparatus, such as, for example, a gun-type perforator, as beforementioned.

The invention also provides an electric circuit and means whereby the beforementioned field magnets of the locator apparatus can be magnetized without disassembly and can also, if desired, be demagnetized to facilitate disassembly of the apparatus.

In a preferred embodiment of the invention, a length of high permeability magnetic material is positioned intermediate the inner adjacent ends of the magnets and in about the middle of the inductor or pickup coil to form a magnetic flux path between the inner ends of the magnets and through the central portion of the coil. The assembly of coil and magnets is encased in an elongated tubular housing of non-magnetic material, but two annular pole pieces, each one in contact with an outer end of the magnets of the assembly, are also positioned in contact with encasing end members of magnetic material which close the ends of the beforementioned non-magnetic tubular housing. This arrangement extends the two outer pole pieces radially to the outside of the housing of the apparatus and close to the casing wall in which the device may be run. Leads are tapped off from intermediate portions of the coil each near each opposite end of the beforementioned length of magnetic material so that the length of the coil around the intermediate magnetic material can be by-passed when the field magnets are to be magnetized, or demagnetized. In addition, a rectifier circuit, which acts as a current limiter circuit, as hereinafter more fully described, is connected in parallel to the pickup coil so that nearly all of the perforating gun firing current is by-passed around the coil to substantially completely avoid any tendency of the firing current to demagnetize the field magnets.

A more detailed description of a specific embodiment of the invention is given hereinafter with reference to the drawings, wherein:

FIGURE 1 is an elevational view showing a collar locator apparatus and perforating gun assembly in position inside a typical well casing shown in longitudinal section and provided with casing collar joints;

FIGURE 2a is an enlarged partial view of FIGURE 1 showing the upper portion of the locator apparatus in longitudinal section;

FIGURE 2b is a similar view showing the upper end of the perforator gun in section;

FIGURE 3a is a circuit diagram schematically showing part of the perforator gun-firing circuit, the rectifier by-pass circuit and recorder and current supply connections;

FIGURE 3b is a similar diagram showing the remaining part of the perforating gun-firing circuit including a connector plug; and FIGURE 3c is a similar diagram showing a portion of the field magnet charging and discharging circuit.

Referring first primarily to FIGURE 1, a casing joint locator 10 embodying the features of this invention is shown suspended in operating position within typical well casing 11 having collard joints 12, by means of a conductor cable 13, which passes over a sheave 14 at the top of the borehole and therefrom to suitable lowering and hoisting apparatus, not shown. The lower end of the cable 13 makes mechanical and electrical connection with the top of the casing joint locator 10 through a conventional cable head 15, and the electrical conductor contained in and extending throughout the length of the cable 13 makes electrical connection, as illustrated at 16 at the top of the borehole, through suitable means (not shown) to indicating or recording apparatus and firing control circuits indicated generally at 17 in FIGURE 1 and in more detail in FIGURE 3a. A gun-type well perforator 18 is coupled, by means of a connector 19, to the lower end of the casing joint locator 10 and is interconnected electrically with the casing joint locator and the surface equipment, as more fully described hereinafter.

Reference is now made primarily to FIGURE 2a in which the construction of the casing joint locator 10 is shown in more detail. Two cylindrical field magnets 20 and 21, preferably spaced apart longitudinally by a similarly shaped, cylindrical body 22 of high permeability ferromagnetic or paramagnetic material, are positioned in coaxial alignment with their like poles directed inwardly adjacent and located coaxially within a voltage pickup or inductor coil assembly 23. The field magnets 20 and 21 are made of magnetic material, such as Alnico, capable of being magnetized to produce a strong magnetic field. For a collar locator having an overall outside diameter of approximately 4 inches these magnets may be about 1.5 inches in diameter and about 4.3 inches long. The intermediate body of ferromagnetic material 22 may be of high permeability iron of the same diameter as the field magnets and preferably about 2.75 inches in length.

The coil assembly 23 containing the field magnets 20 and 21 and the beforementioned intermediate ferromagnetic body member 22 is enclosed in a fluid-tight cylindrical housing 28 made of non-magnetic material such as, for example, stainless steel or K-Monel. Over the outer end of each of the magnets 20 and 21 are fitted generally disc-shaped ferromagnetic pole pieces 31 and 32, respectively, as shown in FIGURE 2a. The pole pieces 31 and 32 are held in contact with the ends of the field magnets by end coupling members 33 and 34 which also are made of magnetic material such as iron or steel and are threaded on to the ends of the non-magnetic housing 28 at 36 and 37. O-rings 38 and 39 are employed in the threaded connections to exclude borehole fluid from entrance into the housing.

Upper end coupling member 33 serves as a cable head adapter which makes threaded connection at 40 with the cable head 15. The lower end coupling member 34 makes threaded connection at 35 with a connector 42 which in turn is detachably coupled to the top end of the perforator gun 18 by means of a union nut 44 which makes threaded connection with the top end of the body of the gun perforator at threads 45. The lower end portion 46 of the connector 42 extends into a seating position within the top of the perforator gun body as shown in FIGURE 2b, and contains electrical connection means, hereinafter more fully described, for interconnecting the electrical circuits of the collar locator and in turn the electrical circuit extending therefrom to the surface of the borehole, with the firing control apparatus within the gun perforator.

The upper end coupling member 33 contains an insulated electrical connector bushing assembly 48 which is held in place against an internal annular flange 50 by means of an internal annular nut 52 threaded at 53 inside the coupling member or cable head adapter 33. A connecting bolt 54 extends through a concentric bore in the bushing 48 and makes electrical connection at the upper and lower ends thereof with conductors 56 and 57 which in turn are electrically connected to the conductor cable 13 and the top connection of inductor coil 25, respectively.

In the 4-inch diameter locator mentioned hereinabove, the inductor coil assembly 23 preferably is wound in three separate sections or units, shown at 25, 26 and 27; the outermost units 25 and 27 each being wound with about 2250 turns of No. 23 AWG enameled wire, and each having a resistance of aproximately 40 ohms; and the middle coil 26 being wound with about 13,500 turns of No. 29 AWG enameled wire having a resistance of approximately 520 ohms; the total resistance of the series-connected coils thereby being approximately 600 ohms.

The lower ends of coil units 25, 26 and 27, as best shown in FIGURE 3a, are connected at 25a, 26a and 27a through conductors 61a, 61b and 61c, respectively, with prongs E, C and A of a connector plug element 65a. The top end of coil unit 25 is connected through conductor 61 with the prong D of the plug element 65a, and the lower end of the coil unit 27 is connected at 27a through conductor 67 with a current control unit 70 and thence through conductor 61d to prong B of the beforementioned plug element 65a. Conductors 61, 61a, 61b, 61c and 61d all are grouped together in a bundle and pass through a common flexible conduit 72 which extends to the connector plug 65a and which upon assembly is located and suspended thereby within the central bore 43 of the connector 42 as shown in FIGURE 2b.

A connector socket element 65b normally is coupled to the connector plug element 65a, as shown in FIGURE 2b, such that the prongs A, B, C, D and E enter and make electrical connection with the corresponding sockets at A′, B′, C′, D′ and E′ of the socket element 65b. Plugs B′ and D′ are interconnected by a conductor 74, and socket A′ is connected by a conductor 76 to the top of conductor rod 78 (FIGURE 2b). Rod 78 extends through an insulating bushing 80 which is, in turn, retained in a seated position in the lower enlarged end portion of the bore of the connector 42 on an internal annular threaded nut 81. The lower end of the conductor rod 78 makes electrical contact with a spring-pressed contact button 83 which is electrically connected within the upper portion of the body 18 of the gun perforator to the gun-firing control apparatus (not shown).

The beforementioned current control unit 70 comprises two diode rectifier units 82 and 84 connected in series-parallel but in reversed polarity with respect to each other, as schematically shown, such that whatever polarity of potential may be applied across them through connections 67 and 61d current may pass through one or the other of the diodes depending upon such polarity. As shown in FIGURE 2a, the diodes 82 and 84 are mounted inside an insulating chamber 75 in lower coupling member 34. Silicon diodes sold under the trade designation of Transitron-IN 347 and manufactured by Transitron Electronic Corporation, have been found satisfactory for this purpose. These diodes have a characteristic threshold conductivity potential of approximately 100 millivolts, which is substantially above the signal voltages generated by the inductor coils in normal collar locating operations. However, when a voltage in excess of 100 millivolts is applied across the diodes 82, 84 one or the other, depending upon the polarity of such potential, becomes conductive and thereby forms a relatively low resistance current shunt around the inductor coils 25, 26 and 27 through the electrical circuit consisting of connection 24, conductor 61, plug element D, to socket element D′, thence across conductor 74 to socket element B′ and plug element B, conductor 61d, diode 82 or 84 and conductor 67 to connection 27a. The purpose of this shunting action will be more fully described hereinafter in connection with the operation of the invention.

Referring now primarily to FIGURE 3a, the beforementioned electrical conductor extending through conductor cable 13 is connected by suitable conductor means as diagrammatically illustrated at 16, to the blade 86 of a single-pole double-throw switch 85 having opposite switch contact points 87 and 88.

Switch contact point 87 is connected by way of conductor 90 to a suitable source of electric current, such as battery 91, and thence to ground through conductor 92. Switch contact 88 is connected through conductor 94 to one input terminal 95 of a strip chart recorder 96, the other terminal 97 of which is grounded through conductors 99 and 92. The drive for the chart of the recorder 96 is coupled, by suitable mechanical or electrical means, illustrated at 100, to the sheave 14 over which the conductor cable 13 passes, whereby the chart 101 is moved as indicated by the arrow 102 in correlation with the depth of the collar locator instrument within the casing 11 in the borehole.

Referring now primarily to FIGURE 3c, an electrical current supply means and electrical connections for use in connection with the apparatus of this invention for magnetizing and demagnetizing the field magnets 20 and 21 are there illustrated. One side of a capacitor 105 is connected to the blade 106 of a single-pole double-throw switch 107 having opposite switch contacts 108 and 109. The opposite sides of the capacitor and the switch contact 108 are connected by conductors 110 and 111 to terminals 112 and 113, respectively, of a suitable source of direct current 115. The capacitor 105 is also connected through conductor 116 to socket A″ and switch contact 109 also is connected through conductor 117 with the socket E″ of the socket element 65c. Socket A″ is connected to socket D″ by conductor 118, and socket E″ is connected to socket C″ by conductor 119.

In operation of this invention for casing collar location logging, the apparatus is assembled as shown in FIGURES 1, 2a and 2b with the plug element 65a joined with the socket element 65b such that plug elements A, B, C, D and E are in electrical contact with the socket elements A′, B′, C′, D′ and E′, respectively. Switch 85 is thrown to complete electrical circuit between the switch blade 86 and the switch contact 88. The electrical circuit through the collar locating apparatus is thereby completed by way of ground connection 93, conductors 92 and 99, recorder input terminals 97 and 95, conductor 94, switch contact 88, switch blade 86, conductor 16 in cable 13 to connection 24 at the top end of the inductor coils and thence through inductor coils 25, 26 and 27 to connection 27a, through conductor 61c, plug A, socket A′, conductor 76, through the gun-firing control within the gun perforator 18 and thence to ground, as shown at 46a, and return completing the circuit through the ground-to-ground connection 93. The beforementioned electrical shunting circuit across the inductor coils 25, 26 and 27 is also completed from connector 24 through conductor 61, plug D, socket D′, conductor 74, socket B′, plug B, conductor 61d, diodes 82, 84 and conductor 67 to connection 27a.

The apparatus is then lowered through the well casing as illustrated in FIGURE 1. Since the field magnets 20 and 21 are, as hereinbefore described, positioned in opposition to each other, that is, with like poles adjacent each other, the magnetic fields will ordinarily, in the absence of surrounding disturbing influences, take the form of two closed magnetic circuits symmetrical about a plane intersecting the axis of the field magnets perpendicularly at a point midway between the adjacent ends of the field magnets, as illustrated approximately by the dotted lines 121 and 122. Thus the magnetic field through each half of the inductor coil assembly 23 will be, under such condition, of equal intensity and opposite polarity.

Movement of the collar locator laterally or longitudinally within the casing will not ordinarily disturb the beforedescribed symmetry of the magnetic field through the inductor coil. Thus, normally no appreciable change in the magnetic flux through the inductor coil occurs and no appreciable signal will be induced in the coil until the symmetry or balance of the field is disturbed by the approach and passage of a casing joint or the like discontinuity, which destroys the symmetry in the reluctance of the exterior magnetic field paths 121 and 122 surrounding the field magnets 20 and 21 and thus causes an unbalance of the magnetic fields in such manner as to induce a signal in the inductor coil 23. The resultant signal is transmitted through conductor 16 in the cable 13 to the recorder 96, resulting in the plotting of the signal upon the moving chart 101 to form a graphical representation or record of casing collar locations correlated with depth, as shown at 124. Each time the collar locator passes a casing collar a signal is generated which is represented by an alternating pip or pulse as shown at 125.

It will be seen that by using more than two pole pieces, as in prior art practice, secondary flux paths between pole pieces other than two adjacent pole pieces, are set up which complicate the equilibrium situation resulting from the balanced flux paths so that instead of getting only the two consecutive, oppositely directed, voltage signals in the pickup coil, a family of overlapping signals is obtained as the apparatus passes a casing joint. Also, the use of a coil 23 with a large number of turns extending from one pole piece to the other results in the production of a stronger, higher voltage signal than the use of a short coil between the two magnets.

Furthermore, the use of magnetic end members 33 and 34 in direct contact with the pole pieces 31 and 32 respectively, in effect extends the effectiveness of the pole pieces to the outside of the apparatus and to the end coupling members 33 and 34. This reduces the longitudinal distance over which the flux paths are appreciably effected by changes in reluctance resulting from deviations or irregularities of the casing wall and produces a more intense, more concentrated, magnetic field relatively free of stray flux paths outside those operating between end coupling members 33 and 34. As a consequence, use of the apparatus of this invention produces strong, sharp voltage signals which accurately locate casing collars without the presence of appreciable noise or confusing secondary signals.

When it is desired to fire the gun perforator the blade 86 of the switch 85 is moved into contact with switch contact 87, thereby disconnecting the recorder 96 and connecting the current source 91 between conductor 16 and the ground terminal 93. Current then flows through the circuit comprising conductor 16, connection 24, conductor 61, plug D, socket D', conductor 74, socket B', plug B, conductor 61d, diode 82 or 84, depending upon the polarity, conductor 67, connection 27a, conductor 61c, plug A, socket A', conductor 76, and thence through the firing control apparatus within the body of gun perforator 18 to ground 46a and return through the ground to the beforementioned ground terminal 93 and through conductor 92 to the current source 91.

Due to the relatively high resistance of the inductor coil 23 and the relatively low resistance through the shunting diode 82 or 84 for any potential difference across the diodes above approximately 100 millivolts only a relatively small current flows through the inductor, and most of the current for firing the gun passes through one or the other of the diodes 82 or 84. Thus the diodes 82, 84 act as a shunt across the inductor coil 23 for all voltages thereacross in excess of 100 millivolts. However, for all voltages across the inductor coil of less than 100 millivolts the diodes present a very high resistance. Since the signal voltages generated by the inductor coil in passing the casing collars is usually less than 100 millivolts, the diodes 82, 84 do not act as a shunt for this signal, and therefore permit the signal to be transmitted to the recorder, as hereinbefore described.

The field magnets and inductor coils are thus protected from damage by the relatively heavy current required for activating the firing control apparatus within the gun perforator while at the same time preserving the sensitivity of the collar locator.

When it is desired to magnetize or demagnetize the field magnets, the apparatus is withdrawn from the well casing, the gun perforator body disconnected from the collar locator body by breaking the union connection comprising the union nut 44 and withdrawing the lower end portion of the connector 42 from the upper end of the gun body. After the insulating bushing 80 is removed from connector 42 the plug member 65a is disconnected from the socket member 65b and connected to socket member 65c. The capacitor 105 is then charged by moving the blade 106 of the switch 107 into engagement with switch contact 108, thereby completing the circuit from the D.C. source 115 to the capacitor. The polarity of the charge thus given the capacitor may be determined by the manner of connecting the conductors 110 and 111 to the terminals 112 and 113 of the D.C. source or by suitable switching means associated with the D.C. source 115, not shown.

After the capacitor 105 is thus charged the blade 106 of the switch 107 is swung into engagement with the switch contact 109 which permits the capacitor to discharge through the inductor coils 25 and 27 which are then connected in parallel. Capacitor 105 discharges through coil 25 by way of switch contact 109, conductor 117 socket E'', plug E, conductor 61a, connection 25a, coil 25, connection 24, conductor 61, plug D, socket D'', conductors 118 and 116 and return to the capacitor. Capacitor 105 discharges through coil 27 in the opposite direction from that for coil 25 by way of switch contact 109, conductor 117, socket E'', conductor 119, socket C'', plug C, conductor 61b, connection 26a, coil 27, connection 27a, conductor 61c, plug A, socket A'', and conductor 116 to capacitor 105. It will be noted that coil 26 is excluded from the charging circuit by the shunting or short-circuiting circuit consisting of conductor 61a, plug E, socket E'', conductor 119, socket C'', plug C, and conductor 61b.

While the invention has been herein illustrated and described in what is now considered to be a preferred embodiment, it is to be understood that the invention is not limited to the specific details thereof, but covers all changes, modifications and adaptations within the scope of the appended claims.

What is claimed is:

1. Combination well logging and perforating apparatus for use in a cased borehole comprising: a housing; elongated magnet means in the said housing, said magnet means having a substantially constant magnetomotive force and polarity and being adapted to be lowered therewith into a borehole on a supporting cable and for emitting and receiving magnetic flux at longitudinally spaced-apart locations in the borehole; a relatively high resistance inductor coil positioned in inductive relation to said magnet means for producing voltages normally below a predetermined value responsive to changes in said magnetic flux; an electrically operated perforator connected to said housing, said perforator having electrical actuating means connected in series with said coil; a direct current source adapted for positioning at the top of the borehole and for connection in series with said coil and said perforator actuating means; and a shunt circuit connected across said coil, said circuit including diode means in series therein having a threshold conductivity potential above the aforesaid predetermined voltage and a relatively low resistance at voltages thereacross above said predetermined voltage.

2. Apparatus for use in locating collars in a well casing comprising: a housing; first magnet means within said housing; a first coil in inductive relation to said first magnet means within said housing; second magnet means within said housing aligned with and having its magnetic polarity opposed to that of said first magnet means; a second coil within said housing connected in series with said first coil and in inductive relation to said second magnet means; electrical connection means on the exterior of said housing; and electrical conductors within said housing coupling said first and second coils with said electrical connection means, with said electrical conductors arranged to provide current paths such that connection of a direct current source to said electrical connection means passes current through said first and second coils in opposite directions.

3. Self contained magnetically actuated apparatus for use in well logging and capable of having the magnetic means thereof magnetized or demagnetized without disassembly, said apparatus comprising: a cylindrical housing; first elongated magnet means within said housing, said first magnet means aligned coaxially of said housing with its poles oriented in a given direction; a first inductor coil around said first magnet means; a second elongated magnet means within said housing aligned substantially coaxial with said first magnet means and having its poles oriented in a direction opposite with respect to the orientation of the poles of said first magnet means; a first electrical connection entering said housing; electrical conductor means connecting said first connection to an end of said first coil corresponding to a given pole of said first magnet means; a second electrical connection entering said housing; electrical conductor means connecting said second connection with an end of said second coil corresponding in polarity to the same aforesaid given pole of said second magnet means; a third electrical connection means entering said housing; and terminal means connecting said third connection to ends of said coils opposite those aforesaid so that application of a direct current potential between interconnected first and second connections and said third connection simultaneously produces a magnetizing effect in said first magnet means which is opposed to the magnetic effect in said second magnet means.

4. Apparatus for use in a cased borehole comprising: a housing adapted to be lowered into a borehole on a supporting cable; magnet means within said housing for emitting and receiving magnetic flux at longitudinally spaced-apart locations in such borehole; an inductor coil within said housing positioned in inductive relation to said magnet means; a tool coupled to said housing and adapted to be lowered therewith into a borehole, said tool including electrically operated means for actuation thereof; an electric circuit connecting said inductor coil and said electrically operated means in series; means adapted to connect said circuit to a current source at the top of the borehole; and electric circuit means connected in said electric circuit shunting said inductor coil, which electric circuit means include conductivity control means which render said circuit means shunting said coil conductive only at voltages thereacross above a predetermined threshold value to actuate said electrically operated means.

5. Apparatus according to claim 4 in which said control means comprises a pair of diodes connected in parallel circuits in reverse polarity with respect to one another.

6. Apparatus according to claim 4 in which said control means comprises a pair of silicon diodes connected in parallel circuits in reversed polarity with respect to one another.

7. Apparatus according to claim 4 in which said control means comprises a pair of diodes connected in parallel circuits in reversed polarity with respect to one another, each having a threshold voltage of approximately 100 millivolts.

8. Apparatus for use in a cased borehole comprising: a housing adapted to be lowered into a borehole on a supporting cable; magnet means within said housing having a substantially constant magnetomotive force and polarity and for emitting and receiving magnetic flux at longitudinally spaced-apart locations in such borehole; an inductor coil positioned in inductive relation to said magnet means for producing voltages responsive to changes in said magnetic flux; a perforator connected to said housing and adapted to be lowered into a borehole therewith, said perforator including electrically operated means for actuation thereof; an electric circuit connecting said inductor coil and said electrically operated means in series; means adapted to connect said circuit to a current source at the top of the borehole; and electric circuit means connected in said electric circuit shunting said inductor coil, which shunt circuit means includes conductivity control means connected in series therein and which renders said circuit means shunting said inductor coil conductive only at voltages thereacross above a predetermined threshold value so that perforator actuating signals in said electric circuit of a voltage above such predetermined threshold value are substantially shunted around said inductor coil in passage from the top of said borehole through said electrically operated means.

References Cited in the file of this patent

UNITED STATES PATENTS

| | | |
|---|---|---|
| 2,558,427 | Fagan | June 26, 1951 |
| 2,768,684 | Castel | Oct. 30, 1956 |